June 8, 1943.                D. A. BELL                2,321,353
ELECTRICAL APPARATUS
Filed March 18, 1942
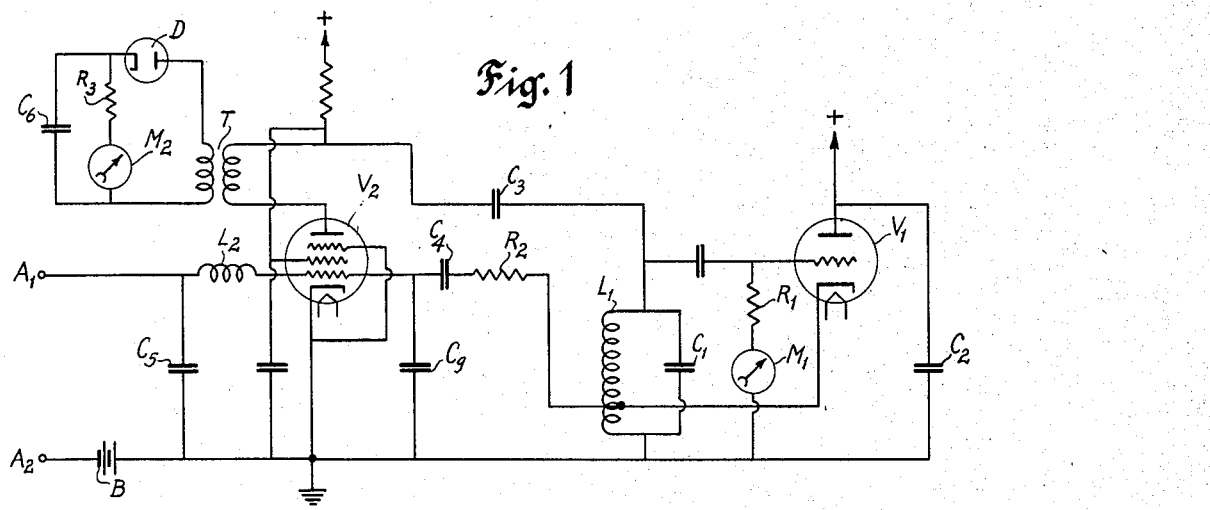
Fig. 1
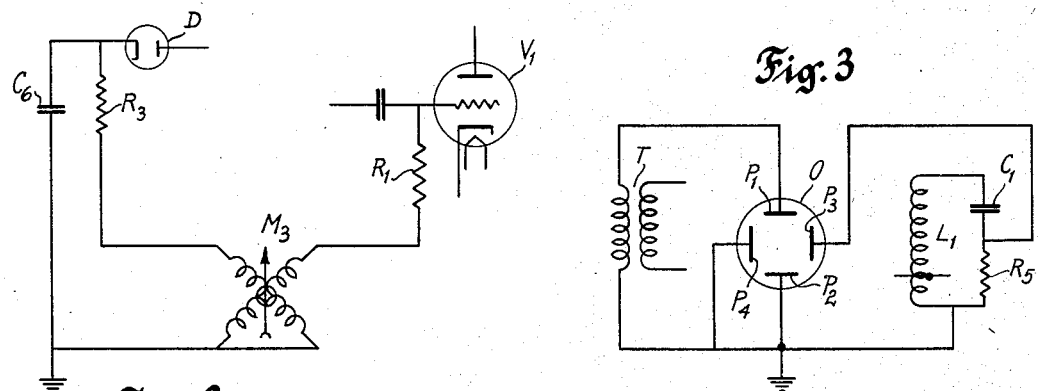
Fig. 2
Fig. 3
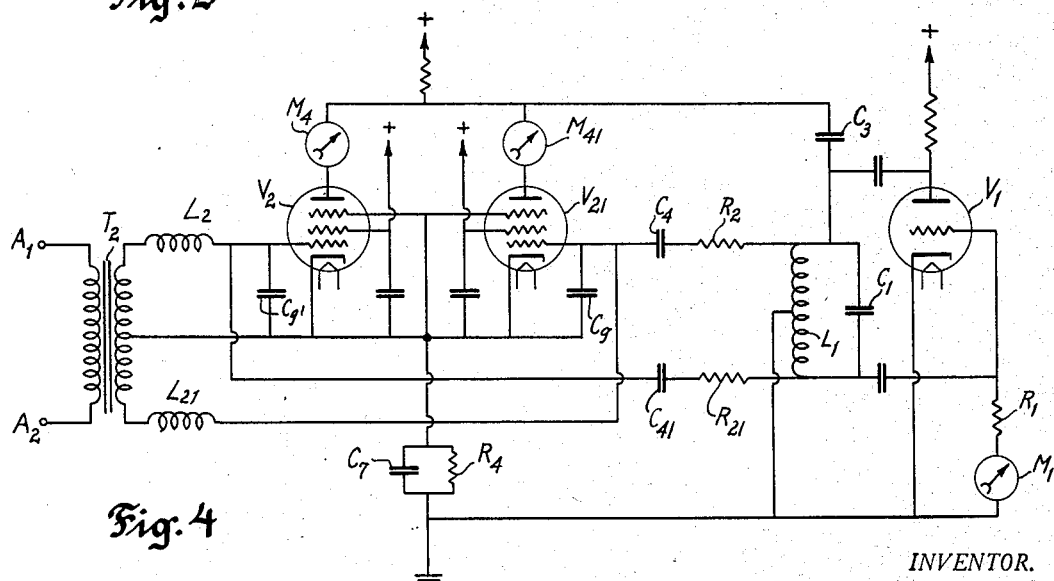
Fig. 4
INVENTOR.
David Arthur Bell
BY
ATTORNEY.

Patented June 8, 1943

2,321,353

UNITED STATES PATENT OFFICE 2,321,353

ELECTRICAL APPARATUS

David Arthur Bell, London, England, assignor to Radio Patents Corporation, a corporation of New York Application March 18, 1942, Serial No. 435,162
In Great Britain March 31, 1941

8 Claims. (Cl. 179—171.5)

This invention relates to methods of measuring the depth of modulation of frequency modulated oscillators of the reactance valve type.

In the reactance valve type of frequency modulated oscillator, the anode-cathode path of a thermionic valve is arranged to serve as one of the reactances in the frequency-determining network of the oscillator. The radio frequency component of the grid potential for the valve is derived in appropriate phase from the oscillator. The magnitude of the effective reactance offered by the anode circuit of the valve is modulated by modulating the anode-to-cathode conductance of the valve.

According to the invention, the peak depth of modulation is measured by measuring the highest value attained during the modulation cycle by the radio frequency component of the anode current of the reactance valve.

In the accompanying drawing Figure 1 shows a circuit diagram of a reactance valve frequency modulated oscillator provided with a modulation meter in accordance with the invention, Figures 2 and 3 are fragmentary diagrams showing modifications of the modulation metering arrangements in the oscillator of Figure 1; and Figure 4 shows a circuit diagram of a balanced reactance valve frequency modulated oscillator provided with a modulation meter in accordance with the invention.

The oscillator shown in Figure 1 is of the cathode-coupled type. The parallel tuned circuit $L_1 C_1$ has its lower end connected to earth and its upper end coupled to the control grid of a triode oscillator valve $V_1$. The cathode of valve $V_1$ is connected to a tapping on inductance $L_1$ and the anode is maintained at fixed potential by coupling to earth through condenser $C_2$. A D. C. milliameter $M_1$, connected in series with the grid leak $R_1$, measures the rectified grid current of valve $V_1$, and so gives a measure of the oscillatory voltage developed across tuned circuit $L_1 C_1$.

The anode-cathode path of pentode valve $V_2$, which serves as reactance valve, is connected across tuned circuit $L_1 C_1$ by coupling condenser $C_3$.

The control grid of valve $V_2$ is connected to the tapping on inductance $L_1$ by the substantially quadrature phase changing circuit $R_2 C_g$. Condenser $C_g$ may be merely the input capacitance of valve $V_2$. $C_4$ is a coupling condenser having low reactance at oscillation frequency but high reactance at modulation frequency.

Modulation voltages are applied to terminals $A_1$, $A_2$, between control grid and cathode of valve $V_2$ to modulate its conductance, suitable bias being provided by D. C. source B. Choke $L_2$ and condenser $C_5$ prevent radio frequency oscillations from being fed back into the modulation source.

A change $\delta I$ in the peak value of the radio frequency component of the anode current of valve $V_2$, provided that it is small compared with the radio frequency current in inductance $L_1$ or condenser $C_1$, corresponds to a fractional change in oscillation frequency of approximately $$\frac{X}{2E}\delta I$$

where E is the peak value of the radio frequency voltage across the tuned circuit $L_1 C_1$ and X is the reactance of inductance $L_1$ or condenser $C_1$. With larger changes of the radio frequency current in valve $V_2$, there is a nonlinear relation between this current and frequency change.

In order to measure the peak modulation depth in accordance with the invention, if E and X can be assumed to be constant, means are provided to measure the maximum peak value of the radio frequency component of the anode current of valve $V_2$. In the arrangement shown in the drawing this is done by means of transformer T and a conventional peak measurement circuit comprising D. C. milliameter $M_2$, diode D, resistance $R_3$ and condenser $C_6$. Meter $M_2$ may be calibrated directly in depth of modulation.

The frequency is varied by reactance valve $V_2$ over a range lying wholly above or wholly below the natural frequency of tuned circuit $L_1 C_1$, according to the sense of the quadrature phase change in the grid circuit of valve $V_2$. The carrier frequency must be in the middle of the range, and therefore the zero modulation setting of the conductance of valve $V_2$ is represented by a certain value of the radio frequency anode current in valve $V_2$. Meter $M_2$ may be calibrated accordingly.

If there is any variation in the circuit conditions, compensation may be effected by varying the D. C. voltage applied to one of the grids of valve $V_2$ to adjust its conductance until, with zero modulation applied, the required value of radio frequency anode current is obtained.

In a preferred arrangement according to the invention, the measurement is made independent of the value of E, the oscillatory voltage developed, by the use of means to measure the radio of the indication of meter $M_2$ to the indication of meter $M_1$ by the substitution of a well known ratio meter such as of the crossed coil type as shown at $M_3$ in the fragmentary diagram Figure 2.

In another preferred arrangement, in order to avoid also dependence of the reading upon the values of components $L_1$, $C_1$, means may be provided to measure the ratio of the maximum peak value of the radio frequency anode current of valve $V_2$ to the radio frequency current flowing in either of these components. If either $L_1$ or $C_1$ is variable in order to tune the oscillator over a wide frequency range, this ratio will represent percentage frequency change independently of the actual frequency to which the circuit $L_1C_1$ may be tuned.

The measurement of the ratio of two radio frequency currents may be effected by employing these currents to produce mutually perpendicular deflections of the spot of a cathode ray oscillograph tube and by measurement of the angle of inclination of the resulting line traced upon the cathode ray tube screen.

In the modification of the circuit of Figure 1 illustrated by the fragmentary diagram Figure 3, the deflection plates of cathode ray oscillograph tube O are connected to produce deflections in the vertical direction proportional to the radio frequency component of anode current of the reactance valve, and in the horizontal direction proportional to the radio frequency current in condenser $C_1$. The vertical deflection is produced by connecting the unearthed end of the secondary winding of transformer T to deflector plate $P_1$ of the cathode ray tube O, while the opposite deflector plate $P_2$ is earthed. The horizontal deflection is produced by connecting a resistance $R_5$ between the lower plate of condenser $C_1$ and earth, and connecting the junction to deflector plate $P_3$, while the opposite deflector plate $P_4$ is earthed. Resistance $R_5$ must be sufficiently low in value to avoid excessive damping of tuned circuit $L_1C_1$.

With this arrangement the angle of inclination of the trace on the cathode ray tube screen will vary continuously with the depth of modulation. Owing to afterglow or persistence of vision, an illuminated area will be observed on the cathode ray tube screen, and the angle of inclination of the boundary line of this area will represent the maximum value of the ratio of the radio frequency component of anode current of valve $V_2$ to radio frequency current in the condenser $C_1$. This angle will, therefore, also represent the peak depth of modulation.

In the balanced reactance valve frequency modulated oscillator illustrated in Figure 4, the oscillator comprises triode valve $V_1$ and tuned circuit $L_1C_1$ in conjunction with the necessary components to form a conventional Hartley oscillator. As in Figure 1, a D. C. milliameter $M_1$ is connected in series with grid leak $R_1$ to measure the oscillatory voltage developed across tuned circuit $L_1C_1$.

The balanced reactance valve arrangement comprises two similar pentodes $V_2$, $V_{21}$ having their cathodes earthed through a common biassing resistor $R_4$ with by-pass condenser $C_7$ offering low reactance at both modulation and oscillator frequencies.

Oscillatory voltage is applied in opposite phase to the control grids of valves $V_2$, $V_{21}$ in quadrature with the voltage developed across tuned circuit $L_1C_1$. This is effected by connection of the control grids to the opposite extremities of the tuned circuit through quadrature phase shifting networks comprising the resistances $R_2$, $R_{21}$ and capacitances $C_8$, $C_{81}$. Condensers $C_4$ and $C_{41}$ offer low reactance at oscillation frequency and, therefore, prevent the production of modulation frequency currents in the tuned circuit $L_1C_1$. The screen grids of the two pentodes are maintained at constant potential and the suppressor grids are connected to cathode in conventional manner.

The anode-to-cathode conductances of valves $V_2$, $V_{21}$ are modulated in opposite phase by connecting their control grids to opposite ends of the secondary winding of transformer $T_2$, the midpoint of this secondary winding being earthed. The modulation voltage source is applied between terminals $A_1A_2$ to the primary of transformer $T_2$. Chokes $L_2$, $L_{21}$ offer high reactance at oscillation frequency and, therefore, prevent the production of oscillation frequency currents in transformer $T_2$.

The anode circuits of valves $V_2V_{21}$ are connected through separate radio frequency current meters $M_4M_{41}$ and then in parallel through coupling condenser $C_3$ to one end of tuned circuit $L_1C_1$.

The meters $M_4M_{41}$ must indicate the maximum peak values of the radio frequency components of current only, and not be responsive to D. C. components. They may, for example, each be of the type illustrated in detail in Figure 1 comprising transformer T, diode D, resistance $R_3$, condenser $C_6$ and D. C. milliameter $M_2$.

As the conductance of one of the valves $V_2$, $V_{21}$ is raised to vary the frequency, that of the other is lowered, and vice versa. Each of meters $M_4M_{41}$ measures the maximum peak value of the radio frequency component of the anode current of one of the valves. One of these meters, therefore, gives an indication representing the peak modulation in one sense and the other gives an indication representing the peak modulation in the other sense. The meters $M_4M_{41}$ can, therefore, be used not only for measuring directly the degree of modulation but also for the purpose of balancing the modulator, which may, for example, be effected by adjusting the screen grid potential of one of valves $V_2$, $V_{21}$.

If desired, a single meter may be employed and switching arrangements may be provided for its insertion alternatively in positions $M_4$ and $M_{41}$.

From the foregoing it will be evident that the invention is not limited to the specific details and arrangement of parts shown herein for illustration, but that the underlying principle will be susceptible of numerous variations and modifications such as by substitution of equivalent elements in accordance with the broader scope and spirit of the invention as defined in the appended claims. The specification and drawing are accordingly to be regarded in an illustrative rather than in a limited sense.

I claim:

1. In a modulated oscillator of the type comprising a resonant oscillating circuit and at least one reactance control discharge tube operatively associated with said circuit for modulating the frequency of the oscillations produced, a modulation indicator comprising means for determining the peak value during the modulation cycle of the radio frequency output of said reactance tube.

2. In a frequency modulated oscillator of the type comprising a self-excited resonant oscillating circuit and at least one reactance control tube operatively associated with said circuit for modulating the oscillating frequency at a rate and in a degree in dependence upon the frequency and amplitude, respectively, of a modulating signal, a modulation indicator comprising means for determining the peak value during the modulation cycle of the radio frequency output current of said reactance tube impressed upon the said oscillating circuit.

3. In a frequency modulated oscillator of the type comprising a self-excited resonant oscillating circuit and at least one reactance control discharge tube operatively associated with said circuit for modulating the oscillating frequency at a rate and in a degree in dependence upon the frequency and amplitude, respectively, of a modulating signal, a modulation indicator comprising means for extracting radio frequency output energy from said reactance tube, means for determining the peak value during the modulation cycle of the extracted energy.

4. In a frequency modulated oscillator of the type comprising a self-excited resonant oscillating circuit and at least one reactance control discharge tube operatively associated with said circuit for modulating the frequency of said oscillator at a rate and in a degree proportional to the frequency and amplitude, respectively, of a modulating signal, a modulation indicator comprising means for extracting radio frequency output energy from said reactance tube, means for linearly rectifying the extracted energy, and a meter calibrated in degrees of modulation level energized by said rectified energy.

5. In a frequency modulated oscillator of the type comprising a self-excited resonant oscillating circuit and at least one reactance control discharge tube operatively associated with said circuit for modulating the frequency of said oscillator at a rate and in a degree in proportion to the frequency and amplitude, respectively, of a modulating signal, a modulation indicator comprising means for determining the peak value during the modulation cycle of the radio frequency output current of said reactance tube, and means to measure the ratio between the determined peak value of the reactance tube current and the radio frequency voltage developed across said oscillating circuit.

6. In a frequency modulated oscillator of the type comprising a self-excited resonant circuit having inductive and capacitative branches in parallel to each other and at least one reactance control discharge tube associated therewith for modulating the oscillator frequency at a rate and in a degree in proportion to the frequency and amplitude, respectively, of a modulating signal, a modulation meter comprising means for determining the peak value during the modulation cycle of the radio frequency output current of said reactance tube, and means for measuring the ratio between said peak value of the reactance tube current and the radio frequency current through one of the branches of said oscillating circuit.

7. In a frequency modulated oscillator of the type comprising a self-excited resonant oscillating circuit having inductive and capacitative branches in parallel and at least one reactance control discharge tube associated therewith for modulating the oscillating frequency at a rate and in a degree in proportion to the frequency and amplitude, respectively, of a modulating signal, a modulation meter comprising a cathode-ray tube having a pair of angularly oriented ray deflecting means, and means for controlling said deflecting means in accordance with the peak value of the radio frequency currents flowing in the output of said reactance tube and through one of said branches of said oscillating circuit, respectively.

8. In a frequency modulated oscillator of the type comprising a self-excited resonant oscillating circuit having inductive and capacitative branches in parallel and at least one reactance control discharge tube associated therewith for modulating the oscillating frequency at a rate and in a degree in proportion to the frequency and amplitude, respectively, of a modulating signal, a modulation meter comprising a cathode-ray tube having a pair of ray deflecting means oriented at a right angle with respect to each other, and means for exciting said deflecting means in accordance with the peak values of the radio frequency currents flowing through the output circuit of said reactance tube and through one of the branches of said oscillating circuit, respectively.

DAVID ARTHUR BELL.